United States Patent
M. Van Dijk et al.

(10) Patent No.: US 6,635,736 B2
(45) Date of Patent: Oct. 21, 2003

(54) COMPOSITIONS COMPRISING AN ISOCYANATE-FUNCTIONAL COMPOUND, AN ISOCYANATE-REACTIVE COMPOUND, AND A CO-CATALYST

(75) Inventors: Joseph Theodorus M. Van Dijk, Leiden (NL); Edith Hulsbos, Leiden (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/805,544

(22) Filed: Mar. 13, 2001

(65) Prior Publication Data

US 2001/0047071 A1 Nov. 29, 2001

(30) Foreign Application Priority Data

Mar. 13, 2000 (EP) .............................. 00200883

(51) Int. Cl.[7] .................. C08G 18/16; C08L 75/00; C09D 175/00; C08K 5/50
(52) U.S. Cl. ............... 528/51; 528/73; 528/85
(58) Field of Search ................ 528/51, 73, 85

(56) References Cited

U.S. PATENT DOCUMENTS

| | | | |
|---|---|---|---|
| 3,729,404 A | 4/1973 | Morgan et al. | 204/159.15 |
| 4,753,825 A | 6/1988 | Linden et al. | 427/340 |
| 5,084,536 A | 1/1992 | Brinödopke et al. | 526/218.1 |
| 5,159,024 A * | 10/1992 | Brindopke et al. | 525/301 |
| 5,169,979 A * | 12/1992 | Kubillus et al. | 560/176 |
| 5,218,111 A | 6/1993 | Scholl | 540/202 |

FOREIGN PATENT DOCUMENTS

| | | |
|---|---|---|
| EP | 0068454 A1 | 1/1983 |
| EP | 0448224 A1 | 9/1991 |
| EP | 0477516 A1 | 4/1992 |
| WO | WO93/17060 | 9/1993 |
| WO | WO98/41316 | 9/1998 |
| WO | WO 99/33892 * | 7/1999 |
| WO | WO99/33892 | 7/1999 |

OTHER PUBLICATIONS

Abstract for Japanese Patent No. JP5025240.

* cited by examiner

*Primary Examiner*—Rabon Sergent
(74) *Attorney, Agent, or Firm*—Joan M. McGillycuddy

(57) ABSTRACT

The invention pertains to a new composition comprising at least one isocyanate-functional compound comprising at least two isocyanate groups, at least one isocyanate-reactive compound comprising at least two isocyanate-reactive groups selected from mercapto groups, hydroxyl groups, and mixtures thereof, and a co-catalyst comprising a phosphine and a Michael acceptor. The invention further relates to a coating composition comprising the above composition, a method of coating a substrate comprising coating the substrate with the above composition, a substrate coated with that composition, the use of the above composition in the (re)finishing of large vehicles and refinishing of cars, and an adhesive comprising the above composition.

20 Claims, No Drawings

COMPOSITIONS COMPRISING AN ISOCYANATE-FUNCTIONAL COMPOUND, AN ISOCYANATE-REACTIVE COMPOUND, AND A CO-CATALYST

This application claims priority of European Application No. 00200883, filed on Mar. 13, 2000.

FIELD OF THE INVENTION

The field of art to which this invention pertains is that relating to a new composition based on an isocyanate-functional compound, an isocyanate-reactive compound, and a co-catalyst comprising a phosphine and a Michael acceptor.

BACKGROUND OF THE INVENTION

There are many publications that disclose compositions comprising compounds capable of cross-linking or curing under appropriate conditions, such as when mixed with a catalyst, and their use, particularly as coating compositions.

For example, U.S. Pat. No. 5,084,536 discloses a coating composition comprising:

(a) compounds containing at least two unsaturated groups, (b) compounds containing at least two groups having active hydrogen atoms of the type -SH, and (c) a catalyst selected from, among others, phosphanes.

U.S. Pat. No. 3,729,404 discloses a curable composition comprising a polyene containing at least two reactive unsaturated carbon to carbon bonds per molecule and a polythiol containing at least two thiol groups per molecule. The curing takes place in the presence of a phosphine or phosphite.

U.S. Pat. No. 4,753,825 discloses isocyanate cross-linking with mercaptan groups under the influence of a vaporous amine catalyst to cure the coating composition.

EP-A-0 068 454 discloses a multi-pack coating composition comprising:

(a) an isocyanate component, (b) an active hydrogen component, such as polythiol, and (c) a Lewis base, such as tertiary phosphane.

Coatings used for painting various substrates, such as motor vehicles, are required to have physical properties such as good hardness, good mechanical strength, high drying rate, acceptable pot life, and good resistance to water, acids, and solvents. The coatings are also required to have good appearance properties, which means that films must be smooth and have a high gloss and high distinctness of image (DOI). It is also desirable that all properties be retained under prolonged outdoor weathering.

We have found new compositions that are superior to the prior art compositions with regard to achieving some or all of the above desired properties.

SUMMARY OF THE INVENTION

In brief summary, our invention is a composition comprising:

a) at least one isocyanate-functional compound comprising at least two isocyanate groups, b) at least one isocyanate-reactive compound comprising at least two isocyanate-reactive groups selected from mercapto groups, hydroxyl groups, and mixtures thereof, and c) a co-catalyst comprising a phosphine and a Michael acceptor.

In a second embodiment, our invention is a method of coating a substrate comprising coating the substrate with the above composition.

In a third embodiment, our invention is a substrate coated with the composition of the first mentioned embodiment.

In a fourth embodiment, our invention is an adhesive comprising the composition of the first mentioned embodiment.

Other embodiments of the invention encompass details about the compounds employed that comprise the claimed composition, the relative amounts thereof, the conditions appropriate for use of the composition, and the properties of the composition, all of which are hereinafter disclosed in the following discussion of each of the facets of the invention.

DETAILED DESCRIPTION OF THE INVENTION

The catalysts included in the composition of the present invention for the cross-link reaction are a phosphine and a Michael acceptor, hence the name co-catalyst. The total amount of co-catalyst on the solid coating composition is preferably about 0.05 to about 20 wt. %, more preferably about 0.1 to about 15 wt. %, most preferably about 0.5 to about 10 wt. %. The co-catalysts are preferably used in a ratio of Michael acceptor groups to phosphine groups of about 0.05:1 to about 20:1, more preferably about 1:6 to about 6:1. The phosphine compound may preferably be used in a range of about 0.05 to about 20 eq. % on isocyanate-reactive groups, more preferably about 0.1 to about 15 eq. %, most preferably about 0.5 to about 10 eq. %. The Michael acceptor compound may be used in a range of about 0.05 to about 20 eq. % on isocyanate-reactive groups, more preferably about 0.1 to about 15 eq. %.

The isocyanates of the present invention comprise at least one isocyanate-functional compound. The isocyanate-functional compound can be an aromatic, aliphatic, cycloaliphatic and/or araliphatic isocyanate-functional compound optionally comprising heteroatoms such as oxygen and groups such as ester groups. The isocyanate-functional compound can also be an isocyanurate, uretdione, biuret, allophanate, an adduct, NCO prepolymers, or mixtures thereof.

Examples of suitable isocyanates to be used as the isocyanate-functional compound, or as starting materials for preparing an isocyanate-functional compound comprising an isocyanurate, biuret or uretdione structure include organic polyisocyanates represented by the formula

R(NCO)k wherein k is 2 or higher and R represents an organic group obtained by removing the isocyanate groups from an organic polyisocyanate having aromatically or (cyclo)aliphatically bound isocyanate groups. Preferred diisocyanates are those represented by the above formula wherein k is 2 and R represents a divalent aliphatic hydrocarbon group having 2 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms. Examples of organic diisocyanates which are particularly suitable include ethylene diisocyanate, 1,3-propylene diisocyanate, 1,4-tetramethylene diisocyanate, 1,6-hexamethylene diisocyanate, 2,2,4-trimethyl-1,6-hexamethylene diisocyanate, 2-methyl-1,5-diisocyanate pentane, 2-ethyl-1,4-diisocyanate butane, 1,12-dodecamethylene diisocyanate, cyclohexane-1,3- and -1,4-diisocyanate, 1-isocyanato-2-isocyanatomethyl cyclopentane, isophorone diisocyanate, bis-(4-isocyanatocyclohexyl)-methane, 2,4'-dicyclohexylmethane diisocyanate, 1,3- and 1,4-bis(isocyanatomethyl)-cyclohexane, bis-(4-isocyanato-3-methyl-cyclohexyl)-methane, 1-methyl-2,4- and -2,6-d Ilsocyanato cyclohexane, 1-isocyanato-1-methyl-4(3)-isocyanatomethyl cyclohexane, xylene diisocyanate, α,α,α',α'-tetramethyl-1,3- and -1,4-xylylene diisocyanate, 1,3- and 1,4-phenylene diisocyanate, 2,4- and 2,6-toluylene diisocyanate, 2,4'- and 4,4'-diphenylmethane diisocyanate, 1,5-diisocyanato naphthalene, and mixtures thereof. Aliphatic polyisocyanates containing 3 or more isocyanate groups such as 4-isocyanatomethyl-1,8-octane diisocyanate and lysine triisocyanate, and aromatic polyisocyanates containing 3 or more isocyanate groups such as 4,4',4"-triphenylmethane triisocyanate, 1,3,5-triisocyanate benzene, polyphenyl polymethylene polyisocyanates obtained by phosgenating aniline/formaldehyde condensates, and mixtures thereof may also be used.

Examples of suitable polyisocyanates comprising an allophanate structure is include the above-mentioned organic polyisocyanates reacted with a mono- or polyalcohol.

Suitable mono- or polyalcohols which may be used to prepare the polyisocyanates containing allophanate groups include aliphatic, cycloaliphatic, araliphatic or aromatic mono- or polyalcohols. The mono- or polyalcohols may be linear, branched or cyclic, contain at least one carbon atom and have a molecular weight of up to 2500. The mono- or polyalcohols may optionally contain other hetero atoms in the form of, e.g., ether groups, ester groups, etc. However, the mono- or polyalcohols preferably do not contain hetero atoms other than the hydroxyl group(s). The molar ratio of mono- or polyalcohol to polyisocyanate is about 0.01 to about 0.5, preferably about 0.04 to about 0.2. Preferred mono- or polyalcohols are hydrocarbon mono- or polyalcohols and mono- or polyalcohols containing ether groups. The hydrocarbon mono- or polyalcohols preferably contain 1 to 36, more preferably 1 to 20, and most preferably 1 to 8 carbon atoms.

Examples of suitable monoalcohols include methanol, ethanol, n-propanol, isopropanol, n-butanol, isobutanol, t-butanol, n-pentanol, 2-hydroxy pentane, 3-hydroxy pentane, the isomeric methyl butyl alcohols, the isomeric dimethyl propyl alcohols, neopentyl alcohol, n-hexanol, n-heptanol, n-octanol, n-nonanol, 2-ethyl hexanol, trimethyl hexanol, decanol, dodecanol, tetradecanol, hexadecanol, octadecanol, 2,6,8-trimethyinonanol, 2-t-butyl-cyclohexanol, 4-cyclohexyl-1-butanol, cyclohexanol, benzyl alcohol, phenol, the cresols, the xylenols, the trimethylphenols, 2,4,6-trimethyl benzyl alcohol, branched chain primary alcohols and mixtures thereof (which are available from Henkel (Minneapolis, Minn.) under the "STANDAMUL®" trademark) and mixtures of linear primary alcohols (which are available from Shell (Houston, Tex.) under the "NEODOL®" trademark).

Preferred ether-containing monoalcohols include ethoxy methanol, methoxy ethanol, ethoxy ethanol, the isomeric methoxy or ethoxy propanols, the isomeric propoxy methanols and ethanols, the isomeric methoxy butanols, the isomeric butoxy methanols, furfuralcohol and other monoalcohols which have a molecular weight of up to 2500 and are based on ethylene oxide, propylene oxide and/or butylene oxide. It is also possible in accordance with the present invention to use mixtures of the previously described monoalcohols.

Examples of suitable polyalcohols having two or more hydroxyl groups include ethane diol, 1,3-propanediol, 1,2-propanediol, 2-methyl-1,3-propanediol, 1,4-butanediol, 1,3-butanediol, 1,6-hexanediol, neopentylglycol, glycerol, pentaerythritol, trimethylol propane, ditrimethylol propane, 1,4-cyclohexane dimethanol, the monoester of neopentylglycol and hydroxy pivalic acid, 2,2,4-trimethyl pentanediol, and dimethylol propionic acid, and mixtures thereof. Other preferred polyalcohols for the production of suitable polyurethanes include polyester and polyether diols having a number average molecular weight of less than 1000, for example the polyester diol prepared from I mole of phthalic anhydride and 2 moles of neopentyl glycol. It is also possible in accordance with the present invention to use mixtures of the polyalcohols and mixtures of a polyalcohol and the previously described monoalcohols.

Preferred isocyanates are the isocyanurate of hexamethylene diisocyanate and the isocyanurate of isophorone diisocyanate.

Examples of the isocyanate-reactive compound include a mercaptan-functional compound comprising at least two mercapto-functional groups, a hydroxyl-functional compound comprising at least two hydroxyl-functional groups, and a compound comprising at least one mercapto-functional group and one hydroxyl functional group. Also mixtures of these compounds may be used in the compositions of the present invention.

The mercaptan-functional compound comprising at least two mercapto-functional groups may be prepared by direct esterification of a mercapto-functional organic acid with a polyol. Examples of mercapto-functional organic acids include 3-mercaptopropionic acid, 2-mercaptopropionic acid, thio-salicylic acid, mercaptosuccinic acid, mercaptoacetic acid, or cysteine. Examples of compounds prepared according to such a method include pentaerythritol tetrakis (3-mercaptopropionate), pentaerythritol tetrakis (2-mercaptoacetate), trimethylol propane tris (3-mercaptopropionate), trimethylol propane tris (2-mercaptopropionate), and trimethylol propane tris (2-mercaptoacetate).

A further example of a compound prepared according to such a method consists of a hyperbranched polyol core based on a starter polyol, e.g., trimethylol propane, and dimethylol propionic acid. This polyol is subsequently esterified with 3-mercaptopropionic acid and isononanoic acid. These methods are described in European patent application EP-A 0 448 224 and International patent application WO 93/17060.

Other syntheses to prepare compounds comprising at least two mercapto-functional groups involve:
the reaction of an aryl or alkyl halide with NaHS to introduce a pendent mercapto group into the alkyl and aryl compounds, respectively;
the reaction of a Grignard reagent with sulphur to introduce a pendent mercapto group into the structure;
the reaction of a polymercaptan with a polyolefin according to a Michael addition reaction, a nucleophilic reaction, an electrophilic reaction or a radical reaction; and
the reduction of disulphides.

The most preferred mercapto-functional compound is pentaerythritol tetrakis (3-mercaptopropionate).

The hydroxyl-functional compound comprising at least two hydroxyl-functional groups may be selected from polyester polyols, polyether polyols, polyacrylate polyols, polyurethane polyols, cellulose acetobutyrate, hydroxyl-functional epoxy resins, alkyds, and dendrimeric polyols such as described in WO 93/17060. Also, hydroxyl-functional oligomers and monomers, such as castor oil and trimethylol propane, may be included. A preferred polyol is an acrylate polyol. More preferred is an acrylate polyol available from Bayer having the trade name Desmophen A450. This material is supplied in butyl acetate solution with a solids content of 50%, an OH value of 33 mg KOH/g, and an acid value of 4 mg KOH/g.

The compound comprising at least one mercapto-functional group and one hydroxyl-functional group may for example have a structure according to the following formula: T[(C$_3$H$_6$O)$_n$CH$_2$CHOHCH$_2$SH]$_3$, with T being a triol such as trimethylol propane or glycerol. An example of such a compound is commercially available from Henkel under the trademark Henkel Capcure® 3/800.

Alternatively, the compound comprising at least one mercapto-functional group and one hydroxyl-functional group may be a polyester prepared from (a) at least one polycarboxylic acid or reactive derivatives thereof, (b) at least one polyol, and (c) at least one mercapto-functional carboxylic acid. The polyesters preferably possess a branched structure. Branched polyesters are conventionally obtained through condensation of polycarboxylic acids or reactive derivatives thereof, such as the corresponding anhydrides or lower alkyl esters, with polyalcohols, when at least one of the reactants has a functionality of at least 3.

Examples of suitable polycarboxylic acids or reactive derivatives thereof are tetrahydrophthalic acid, tetrahydrophthalic anhydride, hexahydrophthalic acid, hexahydrophthalic anhydride, methyl hexahydrophthalic acid, methyl hexahydrophthalic anhydride, dimethylcyclohexane dicarboxylate, 1,4-cyclohexane dicarboxylic acid, 1,3-cyclohexane dicarboxylic acid, phthalic acid, phthalic anhydride, isophthalic acid, terephthalic acid, 5-tert. butyl isophthalic acid, trimellitic anhydride, maleic acid, maleic anhydride, fumaric acid, succinic acid, succinic anhydride, dodecenyl succinic anhydride, dimethyl succinate, glutaric acid, adipic acid, dimethyl adipate, azelaic acid, and mixtures thereof.

Examples of suitable polyols include trimethylol propane, trimethylol ethane, glycerol, 1,2,6-hexanetriol, ethylene glycol, 1,2-propylene glycol, 1,3-propylene glycol, 2-methylpropane-1,3-diol, neopentyl glycol, 2-butyl-2-ethyl-1,3-propane diol, cyclohexane-1,4-dimethylol, the monoester of neopentyl glycol and hydroxypivalic acid, hydrogenated Bisphenol A, 1,5-pentanediol, 3-methyl-pentanediol, 1,6-hexanediol, 2,2,4-trimethyl pentane-1,3-diol, dimethylol propionic acid, pentaerythritol, di-trimethylolpropane, dipentaerythritol, and mixtures thereof.

Examples of suitable mercapto-functional organic acids include 3-mercaptopropionic acid, 2-mercaptopropionic acid, thio-salicylic acid, mercaptosuccinic acid, mercaptoacetic acid, cysteine, and mixtures thereof.

Optionally, monocarboxylic acids and monoalcohols may be used in the preparation of the polyesters. Preferably, C$_4$–C$_{18}$ monocarboxylic acids and C$_6$–C$_{18}$ monoalcohols are used. Examples of the C$_4$–C$_{18}$ monocarboxylic acids include pivalic acid, hexanoic acid, heptanoic acid, octanoic acid, nonanoic acid, 2-ethyl hexanoic acid, isononanoic acid, decanoic acid, lauric acid, myristic acid, palmitic acid, isostearic acid, stearic acid, hydroxystearic acid, benzoic acid, 4-tert. butyl benzoic acid, and mixtures thereof. Examples of the C$_6$–C$_{18}$ monoalcohols include cyclohexanol, 2-ethylhexanol, stearyl alcohol, and 4-tert. butyl cyclohexanol.

The phosphine employed as one of the co-catalysts is a compound according to the formula Z(PR$_2$)$_n$, wherein n is an integer of 1 to 6, R is independently selected from an aryl group or (cyclo)alk(en)yl group which may be linear or branched and may or may not contain one or more heteroatoms such as oxygen atoms and halogen atoms, provided that the oxygen heteroatoms are not directly linked to a phosphorus atom.

Preferably, R is an alkyl or aryl group, more preferably the alkyl group has 1 to 15 carbon atoms and the aryl group has 6 to 15 carbon atoms.

In the event that n=1, Z is a group according to R. Such compounds are hereinafter referred to as monophosphines. Examples of monophosphines include triphenyl phosphine and trioctyl phosphine.

In the event that n≧2, Z is selected from an arylene group, (cyclo)alk(en)yl(id)ene group which may be linear or branched and may or may not contain heteroatoms such as oxygen, phosphorus, nitrogen, provided that the oxygen and nitrogen heteroatoms are not directly linked to a phosphorus atom, and/or groups selected from carboxyl, anhydride, cycloalkyl, aryl or may be a single bond. These compounds are hereinafter referred to as polyphosphines. Examples of the polyphosphines include bis (2-diphenylphosphinoethyl) phenylphosphine, 1,4-bis (diphenylphosphino) butane, bis (diphenylphosphino) methane, 1,3-bis(diphenylphosphino) propane, 1,5-bis (diphenylphosphino) pentane, trans-1,2-bis (diphenylphosphine) ethylene, cis-1,2-bis (diphenylphosphino) ethylene, (R)-(+)-2,2'-bis (diphenylphosphino)-1,1'-binaphtyl, tetraphenylbiphosphine, tris 2-(diphenylphosphino) (ethyl) phosphine, 1,1-bis (diphenylphosphino) ethylene, 1,1,1-tris (diphenylphosphinomethyl) ethane, 2,3-bis (diphenylphosphino) maleic anhydride, 1,2-bis (diphenylphosphino) benzene, 1,2-bis (pentafluorophenyl) (phosphino) ethane, (2R,3R)-(-)-2,3-bis (diphenylphosphino) bicyclo [2.2.1] hept-5-ene, and ethylene-bis (2-methoxyphenyl) (phenylphosphine). Preferred are polyphosphines wherein Z is a alkylene group, linear or branched, having 1 to 8 carbon atoms optionally comprising a phosphorus atom and R is an aryl group. The most preferred phosphines are 1,4-bis (diphenylphosphino) butane or triphenylphosphine.

The Michael acceptor preferably comprises one or more olefinically unsaturated groups, the olefinically unsaturated group comprising at least one electron-withdrawing functionality linked to a carbon atom of the unsaturated bond. The olefinically unsaturated bond may be a double or a triple bond. Preferably, the Michael acceptor has a structure according to the following formula I:

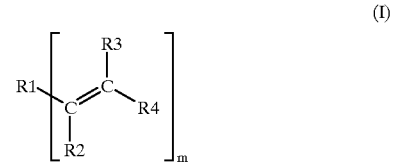

(I)

wherein at least one of R1, R2, R3, and R4 comprises an electron-withdrawing functionality linked to a carbon atom of the unsaturated bond and m is an integer from 1 to 6.

Examples of the electron-withdrawing functionality include carbonyl, carboxyl, ester, thiocarbonyl, thiocarboxyl, thioesters, sulfoxide, sulfonyl, sulfo, phosphate, phosphite, phosphonite, phosphinite, nitro, nitrile, and amide.

In the event that m is 1, at least one of R1, R2, R3, and/or R4 comprises the electron withdrawing functionality and the electron-withdrawing functionality may be attached to a hydrogen atom, linear or branched alkyl, cycloalkyl, alkenyl, cyclo-alkenyl, alkynyl, cyclo-alkynyl, and aryl which may optionally be substituted with various other functionalities, such as carboxylic acid or hydroxide. If they do not comprise an electron-withdrawing functionality, R1, R2, R3, and/or R4 may be independently selected from a hydrogen atom, linear or branched alkyl, cycloalkyl, alkenyl, cyclo-alkenyl, alkynyl, cyclo-alkynyl, and aryl which may optionally be substituted with various functionalities, such as carboxylic acid or hydroxide. R1 and R3 or R2 and R4 may also form a ring comprising one or more electron withdrawing functionalities.

In the event that m is 2 to 6, R1 is selected from a simple bond, an electron withdrawing functionality, and a polyvalent group derived from a hydrocarbon compound optionally comprising hetero atoms such as —O—, —S—, —Si—, and —P—, groups such as amide, urea, and ester groups, and/or one or more electron withdrawing functionalities. The hydrocarbon compound 10 may be a substituted or unsubstituted alkane, cycloalkane, alkene, cycloalkene, alkyne, cycloalkyne, arene, or combinations thereof. The polyvalent group is preferably derived from a polyalcohol. Examples of such polyalcohols include trimethylol propane, trimethylol ethane, glycerol, 1,2,6-hexanetriol, ethylene glycol, 1,2-propylene glycol, 1,3-propylene glycol, 2-methylpropane-1, 3-diol, neopentyl glycol, 2-butyl-2-ethyl-1,3-propane diol, cyclohexane-1,4-dimethylol, the monoester of neopentyl glycol and hydroxypivalic acid, hydrogenated Bisphenol A, 1,5-pentanediol, 3-methyl-pentanediol, 1,6-hexanediol, 2,2, 4-trimethyl pentane-1,3-diol, dimethylol propionic acid, pentaerythritol, di-trimethylolpropane and dipentaerythritol. Alternatively, R3 may also form a ring with R1 comprising one or more electron withdrawing functionalities.

Examples of Michael acceptors are isobornyl acrylate, isooctyl acrylate, 2,2'-methylene bis (6-t.butyl 4-methyl phenol) monoacrylate, phenoxyethyl acrylate, lauryl acrylate, dicyclopentadiene acrylate, N-butyl maleimide, benzyl acrylate, trimethylol propane tri-acrylate, maleic anhydride, a trifunctional adduct of isophorone diisocyanate and 2-hydroxyethyl maleimide, diethyl maleate, methoxypropyl citraconimide, diethylbenzylidene malonate, or an o,p-unsaturated aldehyde, e.g., cinnamaldehyde or citral. The most preferred Michael acceptors comprise trimethylol propane triacrylate, Irganox 3052 or N-butyl maleimide.

The ratio of isocyanate groups to thiol groups and/or hydroxyl groups is between about 0.5:1 and about 3:1, preferably about 0.8:1 to about 2:1.

The composition according to the present invention may be a water borne composition, a solvent borne composition or a solvent-free composition. Since the composition may be composed of liquid oligomers, it is especially suitable for use as a high-solids composition or a solvent-free composition. Preferably, the theoretical volatile organic content (VOC) in the composition is less than about 450 g/l, more preferably less than about 350 g/l, most preferably less than about 250 g/l.

The composition may contain pigments, effect pigments such as aluminium parts, UV absorbers, adhesion promoters such as epoxy silane, HALS-type stabilizers, flow additives or other additives.

The present compositions are of particular interest in coating compositions or adhesives. Preferably, a two-pack composition is used. Preferably, the first component of the two-pack coating or adhesive comprises the compound comprising two or more isocyanate-functional groups as well as one of the co-catalysts, while the second component of the composition comprises the compound comprising the isocyanate-reactive groups and the other co-catalyst.

The composition according to the present invention can be applied by conventional methods, including spraying, brushing, roller coating or dipping. The composition of the present invention is also suitable for application by an external mixing apparatus, one wherein a liquid composition comprising at least one isocyanate-functional compound, at least one isocyanate-reactive compound and the phosphine compound of the co-catalyst is sprayed via a spray nozzle, with a small amount of a liquid catalyst composition comprising a Michael acceptor. Such an apparatus is described, for example, in WO 98/41316. Due to the very effective use of the catalysts, the compositions according to the present invention have very short curing times, which makes this method specifically suitable for these compositions.

The composition according to the invention can be used on various substrates, in particular wood, plastics, and metal substrates such as aluminium, steel, or galvanized steel, for industrial applications of any kind. The composition can be used for instance as an adhesive or as a coating, e.g., as a putty, primer, filler, base coat, top coat or clear coat. Since it is easily sprayable, can be applied at ambient temperatures, and the resulting coating has a high gloss, the composition is especially useful in the refinish industry, in particular the body shop, to repair automobiles and in the automotive industry for the finishing of large transport vehicles, such as trains, buses, and airplanes. Most preferred is the use thereof as a car repair coating. Generally in car repair, several layers need to be applied, such as a primer, a filler, a base coat, and a clear coat. Because of the short drying times, a next layer can be applied within a short time from applying the first layer.

The following examples are presented to illustrate the present invention and are not intended to unduly restrict the scope and spirit of the claims attached hereto.

EXAMPLES

| List of abbreviations: | |
| --- | --- |
| NTI | nonane triisocyanate |
| LTI | lysine triisocyanate |
| P(SH)4 | pentaerythritol tetrakis (3-mercaptopropionate) |
| TPP | triphenyl phosphine |
| BDPB | 1,4-bis-(diphenylphosphino)butane |
| LA | lauryl acrylate |
| DMEA | dimethyl ethanolamine |
| TMP(Acr)3 | trimethylol propane triacrylate |
| INA | isononanoic acid (3,5,5-trimethylhexanoic acid) |
| Penta | pentaerythritol |
| TMP | trimethylolpropane |
| HHPAA | hexahydrophthalic acid anhydride |
| PAA | phthalic acid anhydride |
| MPA | mercaptopropionic acid |

| Other compounds used | |
| --- | --- |
| Desmodur ® LS2025 ex Bayer | isocyanurate of hexamethylene diisocyanate |
| Desmodur ® N3390 ex Bayer | isocyanurate of hexamethylene diisocyanate |
| Tolonate ® HDT-LV ex Rhodia | isocyanurate of hexamethylene diisocyanate |
| Vestanat ® T 1890 ex Hüls | isocyanurate of isophorone diisocyanate |
| Desmodur ® LS2102 ex Bayer | allophanate of hexamethylene diisocyanate and butanol |
| Desmophen ® A450 ex Bayer | acrylate polyol in butyl acetate (s.c.: 50%; OH value: 33 mg KOH/g; acid value: 4 mg KOH/g) |

-continued

| Other compounds used | |
|---|---|
| Irgafos TPP ex Ciba Geigy | triphenyl phosphite ester (25 wt. % in butyl acetate) |
| Irganox 3052FF ex Ciba Geigy | 2,2'-methylene bis(6-tert.butyl,4-methylphenol)monoacrylate |
| Disperbyk 110 ex Byk Chemie | dispersant (52 wt. % in methoxypropylacetate/alkylbenzene (1/1)) |
| Byk 325 ex Byk Chemie | flow additive (25 wt. % in butyl acetate) |
| Byk 333 ex Byk Chemie | flow additive (25 wt. % in butyl acetate) |

Methods

The drying times were measured using a BK drying recorder at 23° C. The drying time is the time between the application of the sample and the phase when the pen of the BK drying recorder does not damage the coating down to the substrate anymore (phase III).

Pot life is twice the initial viscosity. Viscosity was determined by storing the mixtures in stoppered test tubes, leaving a small air headspace. A small ball is put in the sample. The test tubes are inverted at regular intervals. The viscosity increase of the mixtures is determined by the speed of the ball using a viscotimer apparatus.

The Persoz hardness was measured in accordance with ISO 1522, on a glass panel.

The E-modulus (20° C.), Tg, and relative cross-link density were determined with DMA.

The gelling time was determined visually and is the time after which the composition is no longer influenced by gravity.

Stone chip resistance was performed according to the Ford EU BI 57-4 test method. The values 0–7 represent a scale for evaluation of the stone chip resistance ranging from very poor (7) to excellent (0).

Sandability was determined using sandpaper P400 (3M Hookit) and judged using 4 criteria (1) ease of sanding, (2) powdering during sanding (3) filling of sandpaper, and (4) clogging of the sandpaper, i.e. formation of hard shiny lumps that stick to the sandpaper.

Water immersion was performed according to the following method. The coating composition applied to a steel substrate, was exposed to demineralized water for a period of 4 and 14 days. The resistance to water was determined by adhesion. Adhesion was tested using the so-called pull-off test, in which a cross-cut at 450 is made with an Olfa® cutter, after which a standard type adhesion tape is stuck on the paint and gently pulled off again. The values 1–10 represent a scale for evaluation of the adhesion ranging from very poor adhesion (1) to excellent adhesion (10).

Gloss was measured in GU units according to the equivalent standards ISO 2813:1994, ASTM D523-94 and DIN 67 530 (1982).

Mn was determined using polystyrene as a GPC standard.

Example 1 and Comparative Examples A and B

These examples show the need for the combination of catalysts as required by the present invention.

The following coating compositions were applied by hand on glass panels with a 200μ draw bar. All amounts are in grams.

| | 1 | A | B |
|---|---|---|---|
| Tolonate HDT-LV | 19.1 | 19.1 | 19.1 |
| P(SH)4 | 13.3 | 13.3 | 13.3 |
| Butylacetate | 9.7 | 9.7 | 9.7 |
| TPP* | 1.3 | 1.3 | — |
| TMP(Acr)3** | 1.19 | — | 1.19 |
| Drying time | 10 min | >17 hr | >17 hr |
| Pot life | 3 min | >17 hr | >17 hr |

*25 wt. % in xylene
**25 wt. % in butyl acetate

The above Comparative examples A and B are illustrations of the behavior of the compositions in the presence of only one of the two co-catalysts. It is clear from the above that both catalysts are needed for fast curing. The pot life remains excellent with only one of the catalysts present.

Example 2 and Comparative Example C

The purpose of these examples is to illustrate the performance of triphenyl phosphine in combination with a Michael acceptor in accordance with the invention compared to Irgafos TPP in combination with a Michael acceptor.

The following coating compositions were applied by hand on glass panels with a 200 μdraw bar. All amounts are in grams.

| | 2 | C |
|---|---|---|
| Tolonate HDT-LV | 1.9 | 1.9 |
| P(SH)4 | 1.3 | 1.3 |
| Butylacetate | 0.4 | 0.4 |
| TPP* | 0.13 | — |
| Irgafos TPP | — | 0.5 |
| LA** | 0.12 | 0.4 |
| Drying time | 20 min. | No curing |

*25 wt. % in xylene
**25 wt. % in butyl acetate

The above results show the inactivity of the phosphite ester when used as one of the co-catalysts.

Example 3 and Comparative Example D

The purpose of these examples is to illustrate the performance of triphenyl phosphine in combination with a Michael acceptor in accordance with the invention compared to an amine catalyst.

The following coating compositions were applied by hand on glass panels with a 200μ draw bar. All amounts are in grams.

| | 3 | D |
|---|---|---|
| P(SH)$_4$ | 2.6 | 2.6 |
| Tolonate HDT LV | 3.8 | 3.8 |
| TPP* | 0.20 | — |
| LA* | 0.18 | — |
| DMEA** | — | 0.30 |
| Drying time | 20 min. | 20 min. |
| E-mod. | 1904 | 1794 |
| Tg | 66.7 | 55.9 |

-continued

|  | 3 | D |
|---|---|---|
| Rel. x-link density | 60.8 | 51.8 |
| Dried layer thickness | 62 μ | 84 μ |

*25 wt. % in xylene
**0.07 wt. % in xylene

The above results show that at the same reactivity level the composition of the present invention reaches a higher cross-link density, E-modulus, and Tg than a composition catalyzed with amine.

Examples 4–12

The purpose of these examples is to show the catalytic effect of different Michael acceptors and to show their effect on hardness and drying time.
Coating composition:
1.3 g P(SH)$_4$
1.9 g Tolonate HDT-LV
0.4 g butyl acetate
0.13 g TPP (25 wt. % in xylene)

To this coating composition, Michael acceptors were added in equimolar amounts versus TPP. In the table, the percentage means the weight percentage of catalyst in butyl acetate solution.

These coating compositions were applied by hand on glass panels with a 200μ draw bar.

|  |  | Dosing | Persoz |  |  |
|---|---|---|---|---|---|
| Ex. |  | Grams | 1 day | Final | Drying |
| 4 | Isobornyl acrylate 25 wt. % | 0.10 | 97 | 285 | 26 min. |
| 5 | Isooctyl acrylate 20 wt. % | 0.11 | 84 | 288 | 25 min. |
| 6 | Phenoxyethyl acrylate 20 wt. % | 0.11 | 81 | 258 | 23 min. |
| 7 | Lauryl acrylate 25 wt. % | 0.12 | 156 | 279 | 20 min. |
| 8 | Dicyclopentadiene acrylate 25 wt. % | 0.10 | 105 | 279 | 20 min. |
| 9 | N-butyl maleimide 10 wt. % | 0.19 | 26 | 157 | 10 min. |
| 10 | Benzyl acrylate 20 wt. % | 0.10 | 61 | 157 | 9 min. |
| 11 | Trimethylol propane tri-acrylate 10 wt. % | 0.12 | 133 | 238 | 9 min. |
| 12 | Maleic anhydride 10 wt. % | 0.12 | 31 | 119 | 5 min. |

Examples 13–15

The purpose of these examples is to show that the compositions of the present invention can be formulated into ultra low VOC coating compositions.

The following coating compositions were applied by hand on glass panels with a 200μ draw bar. All amounts are in grams.

|  | 13 | 14 | 15 |
|---|---|---|---|
| NTI | 4.9 | — | — |
| LTI | — | 5.1 | 5.1 |
| P(SH)4 | 7.1 | 7.0 | 7.0 |
| TPP* | 0.48 | 0.48 | 0.38 |
| LA** | 0.44 | 0.44 | 0.35 |
| Drying | 20 min. | 12 min. | 18 min. |
| Persoz 1 day | 280 | 238 | 288 |
| Persoz 1 week | 299 | 271 | 303 |

*25 wt. % in xylene
**25 wt. % in butylacetate

The coating composition comprising NTI results in a VOC of 22 g/l at 17 s DinC 4. The coating composition comprising LTI has a VOC of 91 g/l at the same viscosity. Example 15 shows the effect of less catalyst on the curing rate of the coating composition.

Examples 16–23

These examples show that mixtures of SH and OH with NCO can be used in addition to the SH-NCO coating compositions illustrated thus far. In addition, these examples show the possibility to use different ratios of co-catalysts TPP/TMP(Acr)3.
Coating composition:
2.48 g P(SH)$_4$
5.16 g Desmodur N3390
12.39 g Desmophen A450
9.97 g butyl acetate These coating compositions were applied by hand on glass panels with a 200μ draw bar. All amounts are in grams.

|  | 16 | 17 | 18 | 19 |
|---|---|---|---|---|
| TPP* | 0.20 | 0.40 | 0.80 | 1.60 |
| TMP(Acr)3* | 0.40 | 0.40 | 0.40 | 0.40 |
| Drying time | 26 min | 23 min | 23 min | 18 min |
| Persoz (1 day) | 118 | 149 | 128 | 125 |
| Persoz (1 week) | 215 | 241 | 241 | 225 |

-continued

|  | 20 | 21 | 22 | 23 |
|---|---|---|---|---|
| TPP* | 0.40 | 0.40 | 0.40 | 0.40 |
| TMP(Acr)3* | 0.20 | 0.40 | 0.80 | 1.60 |
| Drying time | 25 min | 23 min | 16 min | 15 min |
| Persoz (1 day) | 148 | 153 | 117 | 141 |
| Persoz (1 week) | 255 | 240 | 211 | 234 |

*25 wt. % in butylacetate

In the first series, the amount of TMP(Acr)3 is kept constant, with the TPP amount being varied. This shows a minor effect on drying time and hardness. In the second series, the amount of TPP is kept constant.

Examples 24–33

These examples further illustrate the effect of changing catalyst ratios on the drying time and the pot life. This is done for two different isocyanates. These coating compositions were applied by hand on glass panels with a 200μ draw bar. All amounts are in grams.

|  | 24 | 25 | 26 | 27 | 28 |
|---|---|---|---|---|---|
| Tolonate HDT-LV | 19.1 | 19.1 | 19.1 | 19.1 | 19.1 |
| P(SH)4 | 13.3 | 13.3 | 13.3 | 13.3 | 13.3 |
| Butyl acetate | 9.7 | 9.7 | 9.7 | 9.7 | 9.7 |
| TPP* | 1.3 | 1.3 | 1.3 | 0.65 | 0.32 |
| LA** | 0.3 | 0.6 | 1.19 | 1.19 | 1.19 |
| TPP:LA ratio | 1:0.25 | 1:0.5 | 1:1 | 0.5:1 | 0.25:1 |
| Drying time | 39 | 25 | 19 | 24 | 32 |
| Pot life | 25 | 20 | 11 | 18 | 31 |
| Persoz (1 day) | 57 | 174 | 160 | 200 | 191 |
| Persoz (1 week) | 153 | 296 | 267 | 284 | 245 |

|  | 29 | 30 | 31 | 32 | 33 |
|---|---|---|---|---|---|
| Desmodur N3390 | 21.2 | 21.2 | 21.2 | 21.2 | 21.2 |
| P(SH)4 | 12.0 | 12.0 | 12.0 | 12.0 | 12.0 |
| Butyl acetate | 7.5 | 7.5 | 7.5 | 7.5 | 7.5 |
| TPP* | 1.52 | 1.52 | 1.52 | 0.76 | 0.38 |
| LA** | 0.35 | 0.7 | 1.39 | 1.39 | 1.39 |
| TPP:LA ratio | 1:0.25 | 1:0.5 | 1:1 | 0.5:1 | 0.25:1 |
| Drying time | 40 | 20 | 16 | 22 | 28 |
| Pot life | 19 | 13 | 11 | 15 | 25 |
| Persoz (1 day) | 11 | 27 | 141 | 150 | 74 |
| Persoz (1 week) | 163 | 215 | 164 | 159 | 311 |

*25 wt. % in xylene
**25 wt. % in butylacetate

Examples 34 and 35

Steel panels were treated with a primer, Autosurfacer 940, ex Akzo Nobel Coatings BV, dried, sprayed with a metallic base coat, ex Akzo Nobel Coatings BV, and dried. The following clear coat compositions were prepared and sprayed on the panels. All amounts are in grams.

|  | 34 | 35 |
|---|---|---|
| Desmodur N3390 | 35.4 | — |
| Tolonate HDT-LV | — | 31.9 |
| P(SH)4 | 20 | 22.2 |
| Byk 325 | 0.16 | 0.16 |
| Butyl acetate | 14.6 | 15.7 |
| TPP* | 2.2 | 2.2 |
| LA** | 2.05 | 2.05 |
| Drying time | 20 min. | 20 min. |

*25 wt. % in xylene
**25 wt. % in butylacetate

Examples 36–38

These examples illustrate the amounts of catalyst needed to achieve equal curing times for different isocyanates. These coating compositions were applied by hand on glass panels with a 200μ draw bar. All amounts are in grams.

|  | 36 | 37 | 38 |
|---|---|---|---|
| P(SH)4 | 4.0 | 3.0 | 4.0 |
| Desmodur LS2025 | 6.1 | — | — |
| Desmodur LS2102 | — | — | 6.6 |
| Vestanat T1890 E | — | 8.6 | — |
| Butyl acetate | 1.0 | 1.0 | 1.0 |
| TPP* | 0.4 | 1.8 | 0.42 |
| LA** | 0.37 | 1.7 | 0.39 |
| Drying time | 26 min. | 27 min. | 26 min. |

*25 wt. % in xylene
**25 wt. % in butylacetate

Examples 39 and 40 and Comparative Examples E to I

The purpose of these examples is to illustrate the effect of changing the amount of the Michael acceptors to a value higher than a catalytic amount.

A coating composition was prepared comprising the following compounds
13.02 g P(SH)$_4$
19.52 g Tolonate HDT-LV
1.3 g TPP (25 wt. % in xylene)

To this coating composition, a Michael acceptor selected from laurylacrylate and trimethylolpropane triacrylate was added in an increasing percentage. Butyl acetate was added to obtain a VOC of 200 g/l. The coating compositions were applied by hand on glass panels using a 200μ draw bar.

|  | 39 | E | F |
|---|---|---|---|
| Wt. % LA on solids | 1.4 | 26.2 | 38.3 |
| Wt. % Co-catalyst on solids | 2.3 | 27.0 | 39.0 |
| Phase 3 drying time (min) | 33.6 | 13.8 | 11.8 |
| Appearance film | OK | NOK | NOK |
| Hardness film after 24 hours | Low | Wet | Wet |
| Butterflying of film | No | Strong | Strong |
| Remarks |  | LA exudes from film |  |

OK means acceptable
NOK means not acceptable e.g. cloudy

|  | 40 | G | H | I |
|---|---|---|---|---|
| Wt. % TMP(Acr)3 | 0.6 | 16.5 | 28.3 | 40.9 |
| Wt. % Co-catalyst on solids | 1.6 | 17.3 | 29.0 | 41.4 |
| Phase 3 drying time (min) | 14.7 | 2.9 | 1.2 | 1.0 |
| Viscosity after adding TMP(Acr)3 | 135 | Gel | Gel | Gel |
| Remarks |  | TMP(Acr)3 exudes from film |  |  |

Examples 41 and 42

These examples illustrate the effect of different phosphine compounds on the drying time.

The following compositions were prepared in an equivalent ratio 1:1 of NCO—SH. All amounts are in grams. The coating compositions were applied on glass panels by using a 200μ draw bar and the drying time was established. The gelling time was determined in the pot.

|  | 41 | 42 |
|---|---|---|
| P(SH)4 | 24.1 | 24.1 |
| Tolonate HDT-LV | 36.16 | 36.16 |
| TPP* | 1.21 | — |
| BDPB** | — | 2.46 |

-continued

|  | 41 | 42 |
|---|---|---|
| TMP(Acr)3*** | 1.39 | 1.39 |
| Butyl acetate | 15.0 | 15.0 |
| Drying time | 15–20 min | 3.2 min |
| Gelling time | 3 min | 1 min |

*25 wt. % in xylene
**10 wt. % in methylenechloride
***25 wt. % in butyl acetate The use of the BDPB phosphine resulted in a very fast drying composition, and therefore may also be useful in an external mixing apparatus.

Examples 43, 44, and Comparative Example J

In these examples two compositions according to the invention were prepared to which pigments were added. The resulting filler compositions were compared to a commercially available primer composition Autosurfacer 940 HS ex Akzo Nobel Coatings BV. Because of the use of a very reactive Michael acceptor, Irganox 3052, an external mixing apparatus was used, wherein the Michael acceptor was added to the composition external of the mixing apparatus, just before application on the substrate. The substrate was steel.

| Composition 43 | |
|---|---|
| P(SH)4 | 42.51 g |
| Tolonate HDT-LV | 63.88 g |
| Disperbyk 110 | 19.86 g |
| Butyl acetate | 30.58 g |
| TPP (25 wt. % in xylene) | 4.83 g |
| Pigments: talc, barite, TiO$_2$ and carbon black | 331.06 g |
| 1.04 wt. % Irganox 3052 on total resin solids | |
| Composition 44 | |
| P(SH)4 | 88.38 g |
| Tolonate HDT-LV | 132.1 g |
| Disperbyk 110 | 17.68 g |
| Butyl acetate | 131.16 g |
| TPP (25 wt. % in xylene) | 9.04 g |
| Pigments: talc, TiO2, chalk and Zn3(PO4)2 | 353.54 g |
| 0.29 wt. % Irganox 3052 on total resin solids | |

|  |  | 43 | 44 | J |
|---|---|---|---|---|
| VOC | (theor.)g/l | 313 | 312 | 510 |
| Sandability | Ease | ++ | ++ | ++ |
|  | Powdering | ++ | ++ | ++ |
|  | Filling of Sandpaper | + | + | ++ |
|  | Clogging of sandpaper | + | + | ++ |
|  | After . . . hr | 0.5 | 0.5 | 16 |
| Stonechip resistance | Ford 57-4 | 3–4 | 3–4 | 4–5 |
| Water immersion | Initially | 9 | 10 | 9.5 |
|  | 4 days | 9 | 4 | 5 |
|  | 14 days | 3 | 4 | 3 |
|  | Recovery | 8 | 9.5 | 9.5 |

Examples 45 to 48 and Comparative Example K

The following clear coat compositions were prepared to demonstrate the high gloss of the composition according to the invention. The compositions were compared with the commercially available Autocryl LV 420 clear coat composition ex Akzo Nobel Coatings BV (Comparative Example K). The substrate was steel +Autosurfacer 940HS ex Akzo Nobel Coatings BV+Autowave Silver Metallic Base coat ex Akzo Nobel Coatings BV.

Composition 45

Polyester resin A prepared from 7.08 wt. % INA, 30.96 wt. % Penta, 1.54 wt. % dipentaerythritol, 28.42 wt. % HHPAA and 32.00 wt. % MPA was used. This resin is characterised by a OH-value of 160 mg KOH/g solid resin, a SH value of 170 mg KOH/g solid resin, a solids content (%) of 72.6 and Mn of 1400.

| Polyester resin A | 39.90 g |
|---|---|
| Tolonate HDT-LV | 31.40 g |
| Byk 333 (25 wt. % in butyl acetate) | 0.78 g |
| TPP (25 wt. % in xylene) | 7.85 g |
| TMP(Acr)3 (25 wt. % in butyl acetate) | 4.58 g |
| Butyl acetate | 13.25 g |

Composition 46

Polyester resin B prepared from 20.2 wt. % INA, 34.7 wt. % TMP, 29.6 wt. % HHPAA, 2,5 wt. % PAA and 13 wt. % MPA was used. This resin is characterised by a OH-value of 78, a SH value of 76, a solids content (%) of 80.9 and Mn of 1785.

| Polyester resin B | 49.00 g |
|---|---|
| Tolonate HDT-LV | 16.90 g |
| Byk 333 (25 wt. % in butyl acetate) | 0.78 g |
| TPP (25 wt. % in xylene) | 14.05 g |
| TMP(Acr)3 (25 wt. % in butyl acetate) | 8.20 g |
| Butyl acetate | 10.50 g |

Composition 47

Polyester resin C prepared from 16.7 wt. % INA, 32.1 wt. % TMP, 26.8 wt. % HHPAA, 2.5 wt. % PAA and 22 wt. % MPA was used. This resin is characterised by a OH-value of 26, a SH value of 120, a solids content (%) of 80.6 and Mn of 1725.

| Polyester resin C | 47.70 g |
|---|---|
| Tolonate HDT-LV | 18.40 g |
| Byk 333 (25 wt. % in butyl acetate) | 0.78 g |
| TPP (25 wt. % in xylene) | 11.82 g |
| TMP(Acr)3 (25 wt. % in butyl acetate) | 6.90 g |
| Butyl acetate | 12.50 g |
| Composition 48 | |
| P(SH)4 | 30.10 g |
| Tolonate HDT-LV | 45.20 g |
| Byk 333 (25 wt. % in butyl acetate) | 0.78 g |
| TPP (25 wt. % in xylene) | 1.51 g |
| TMP(Acr)3 (25 wt. % in butyl acetate) | 1.28 g |
| Butyl acetate | 16.50 g |

| (Comp.) example | Gloss 20° | Gloss 60° | Gloss 85° |
|---|---|---|---|
| 45 | 96 | 100 | 99 |
| 46 | 91 | 97 | 102 |

| -continued | | | |
|---|---|---|---|
| 47 | 92 | 96 | 99 |
| 48 | 97 | 100 | 99 |
| K | 81 | 90 | 96 |

We claim:

1. A composition comprising:
   a) at least one isocyanato-functional compound comprising at least two isocyaflate groups,
   b) at least one isocyanate-reactive compound comprising at least two isocyanate-reactive groups, the isocyanate-reactive groups being mercapto groups, hydroxyl groups, or mixtures thereof, and
   c) a co-catalyst comprising a phosphine and a Michael acceptor.

2. The composition according to claim 1, wherein the isocyanate-functional compound is the isocyanurate of hexamethylene diisocyanate or the isocyanurate of isophorane diisocyanate.

3. The composition according to claim 1, wherein said isocyanate-reactive compound comprises pentaerythritol tetrakis (3-mercaptopropionate).

4. The composition according to claim 1, wherein said phosphine is a compound according to the formula $Z(PR_2)n$, wherein n is an integer of 1 to 6, R is independently selected from an aryl group or (cyclo)alk(en)yl group which is linear or branched and optionally contains one or more heteroatoms, wherein oxygen heteroatoms are not directly linked to a phosphorus atom, Z is a group according to R when n=1 or, when n $\geq 2$, Z is selected from an arylene group, (cyclo)alk(en)yl(id)ene group which is linear or branched and optionally contains heteroatoms, wherein oxygen and nitrogen heteroatoms are not directly linked to a phosphorus atom, and/or groups selected from carboxyl, anhydride, cycloalkyl, aryl or is a single bond.

5. The composition according to claim 4, wherein said phosphine is triphenyl phosphine or 1,4-bis (diphenylphosphino)butane.

6. The composition according to claim 1, wherein the Michael acceptor comprises at least one olefinically unsaturated group, the at least one olefinically unsaturated group comprising at least one electron-withdrawing functionality linked to a carbon atom of the unsaturated bond.

7. The composition according to claim 6, wherein said Michael acceptor comprises trimethylol propane triacrylate.

8. The composition according to claim 1, wherein the Michael acceptor has a structure according to the following formula I:

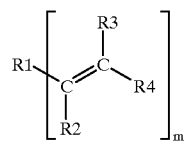

wherein at least one of R1, R2, R3, and R4 comprises an electron-withdrawing functionality linked to a carbon atom of the unsaturated bond, the other of R1, R2, R3, and R4 not comprising an electron withdrawing functionality are independently selected from a hydrogen atom, linear or branched alkyl, cycloalkyl, alkenyl, cyclo-alkenyl, alkynyl, cycloalkynyl, and aryl which optionally are substituted, and m is an integer from 1 to 6.

9. The composition according to claim 8, wherein said Michael acceptor comprises trimethylol propane triacrylete.

10. The composition according to claim 1, wherein the mole ratio of Michael acceptor groups to phosphine groups is about 0.05:1 to about 20:1.

11. The composition according to claim 1, wherein the mole ratio of isocyanate groups to thiol and/or hydroxyl groups is between about 0.5:1 and about 3:1.

12. The composition according to claim 1, wherein the amount of co-catalyst is from about 0.05 to about 20 wt. % of the composition on solids.

13. The composition according to claim 1, wherein the phosphine compound is used in a range of about 0.05 to about 20 eq. % on isocyanate-reactive groups.

14. The composition according to claim 1, wherein the Michael acceptor compound is used in a range of about 0.05 to about 20 eq. % on isocyanate-reactive groups.

15. A method of coating a substrate comprising coating the substrate with the composition according to claim 1.

16. A method according to claim 15, wherein use is made of an external mixing apparatus.

17. A coated substrate coated with the composition according to claim 1.

18. An adhesive comprising the composition according to claim 1.

19. A coating composition comprising the composition according to claim 1.

20. A method of (re)finishing large vehicles and refinishing cars comprising coating the large vehicles and cars with the composition according to claim 1.

* * * * *